No. 705,089. Patented July 22, 1902.
T. H. HUNT.
DUST APPLICATOR.
(Application filed Apr. 26, 1902.)
(No Model.)
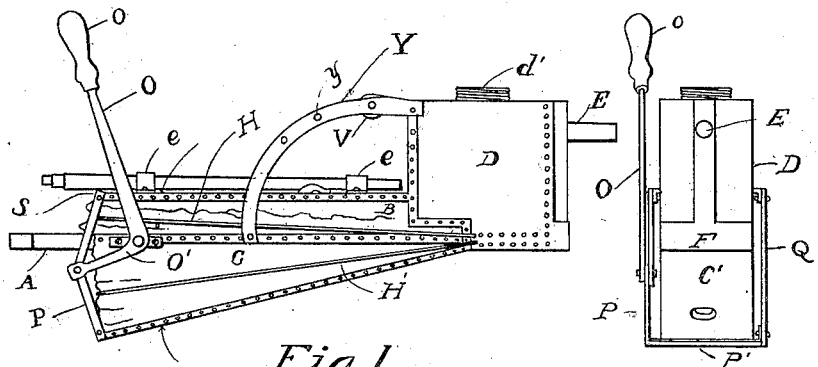
Fig.1.
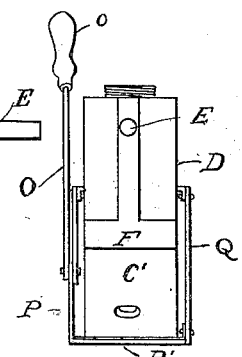
Fig.2.
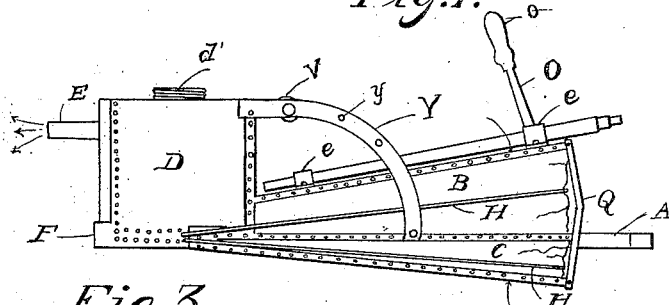
Fig.3.
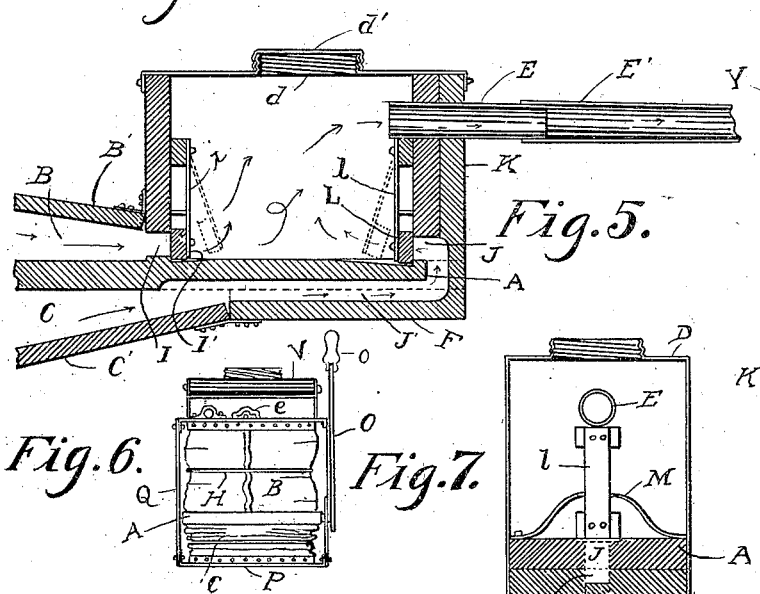
Fig.5.
Fig.6. Fig.7.
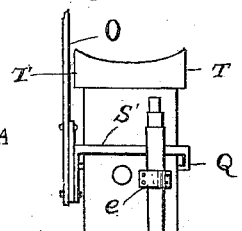
Fig.4.
Witnesses.
E. Gray Powell
David Carswell
Inventor.
Tilman H. Hunt
By Eugene Ayres,
Attorney.

UNITED STATES PATENT OFFICE.

TILMAN H. HUNT, OF ALBANY, MISSOURI.

DUST-APPLICATOR.

SPECIFICATION forming part of Letters Patent No. 705,089, dated July 22, 1902.

Application filed April 26, 1902. Serial No. 104,803. (No model.)

*To all whom it may concern:*

Be it known that I, TILMAN H. HUNT, a citizen of the United States, residing at Albany, in the county of Gentry and State of Missouri, have invented certain new and useful Improvements in Dust-Applicators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention is especially designed for the destruction of insects and fungus diseases on fruit-trees, vines, vegetables, and tobacco; for the extermination of lice and vermin on poultry and live stock; for dispersing rats, gophers, and other burrowing animals, and for use as a disinfectant in houses, cellars, and elsewhere. I attain the object sought by the use of poison ground into a very fine dust, thoroughly incorporated with slaked lime as a medium to convey the poison, applied by means of the machine hereinafter described, and illustrated in the accompanying drawings, in which—

Figure 1 represents a side view of the applicator; Fig. 2, a front view; Fig. 3, a complete side view, but shown as the applicator appears from the side opposite that shown in Fig. 1; Fig. 4, a top plan view; Fig. 5, a vertical longitudinal section of the dust-retainer and its valves, and the bellows and tube broken away; Fig. 6, a rear end view of the applicator; and Fig. 7, a transverse section view of the retainer, showing a detail of the front valve and the shield thereover.

Similar letters of reference indicate corresponding parts in the several views, the letter A in the drawings representing the center board which serves as a solid base against which an upper bellows B and an under bellows C can be compressed. On the forward end of the center board a retainer-box D, to retain the mixed poison and lime-dust, is rigidly secured. This retainer is provided at its top with an inlet $d$ and a screw-cap $d'$. It is also provided with an outlet-tube E, set in the upper part of its front end, to which a separable detachable conveying-tube E', comprising three or more sections, is adapted to be attached. These sections converge toward their outer end, which end is adapted to receive an ordinary deflector for use when it is desirable to apply the dust on the under side of leaves, as in treating tobacco.

To reduce the applicator into compact form for storage and to avoid injury to the sections of tubes when not in use, holders $e\ e$ are provided.

The top B' of bellows B is of wood or other solid material, the front end being hinged, by means of a strong leather strip extending from side to side or in other suitable way, to the rear end of retainer D, said end being spaced from the center board. The bottom C' of bellows C is of similar material to that of the top of bellows B, and the front end contacts with the rear edge of a board or block F, which is nailed to the front end of the bottom of the center board and is also spaced from the bottom of said center board. The rear ends of the boards forming the top of the upper bellows and the bottom of the under bellows are about two inches wider than the ends attached to the retainer, thereby securing greater power to expel the dust. The bellows are closed at the sides and ends with leather, and each bellows is surrounded by a wire guard H, attached to the base of the retainer. These guards are adapted to compress the folds of the leather bellows and keep the leather from protruding when under pressure of air. A port I, entering the rear end of the retainer D from upper bellows B, is provided with a valve I', which valve is held in normal position at the retainer end of the port by a spring-arm $i$. Port J in the front end of retainer D near its base has connection with under bellows C by means of a portway J', which is grooved out of the top side of board F and the bottom of center board A, and at its turn vertically to form connection with said port out of the front end of center board A and the back of a block-strip K, which is attached vertically on the front of retainer D and which also serves as a support for tube E', the inner section E of which tube passes through the block. A valve L, also provided with a spring-arm $l$, coöperates with said port at its retainer end. The arrangement of these ports and valves in the rear and front ends of the retainer instead of in the bottom is essential, because of the fact that, if placed in the bottom, when the applicator is pointed upward to spray into tree-tops the dust inevitably accumulates in the rear end of the retainer while if pointed downward to spray vegetables or for other purpose the dust accumulates in the front end thereof, but with the ports and valves set as shown and described in this applicator such accumulation is wholly prevented, the dust being driven back and forth from one end to the other of the retainer. To prevent any dust dropping behind the valves and back into the ports or bellows when the valves open, a metal strip for a shield M is set closely against each end of the retainer over each valve back of its spring-arm, practically as shown in Fig. 7.

O represents a handle provided with a handhold o and having an L O' on its inner end. This L is preferably about one-fourth the length of the handle. The handle is pivoted at the angle formed by the L to the edge of center board A at a point near the rear of bellows B and C. The end of the L is provided with a loose joint to which a flat metal arm P is attached. This arm extends down to the bottom of the lower bellows C, where it is connected by means of another loose joint to an iron strap P', which extends across the bottom to the opposite side of said bellows, where it is turned up vertically and connected with rigidly-set brace Q. From the loose joint already mentioned on L O' another arm S extends to the top of upper bellows B, where it forms connection by another loose joint to straps S', which extend across the top of said bellows, and, turned downward, forms rigid connection with the other end of brace Q. In operating handle O it will be readily seen said brace Q secures for the two bellows opposite motion simultaneously, one expanding while the other contracts. It will be noticed that the handle being about four times longer than its L the power at the hand is much less than the resistance on the L. In other words, the fact that the handhold describes the arc of a large circle while the loose joint at the end of the L attached to the bellows by means of the arms describes a small circle greatly increases the ease of opening and closing the bellows.

The rear end of the center board is provided with opposite lateral extensions T T, the rear edge of which is concave to bear against the person of the operator and assist him in manipulating the applicator. The device is also provided with a handhold V, supported by metal straps Y Y, attached at the upper rear corners of retainer D and which extend rearward and downward in circular form and the lower ends of which are fastened rigidly to the edges of the center board. These straps are each provided with three or more holes y y to receive a movable rod adapted to carry said handhold. By changing this handhold-rod from one to another of these holes the applicator is adapted to the use of men of different lengths of arms, suiting it to the reach of each, and thereby rendering it easier to support.

I desire it to be understood that I reserve the right to any change or modifications in construction which may be made without departing from the spirit of my invention.

What I claim, and desire to secure by Letters Patent, is—

1. The combination of a center board having a rigidly-attached block beneath its front end, a dust-retainer on the forward end thereof provided with an inlet and cap and a block-strip set vertically on its front, a separable sectional tube having connection with the retainer through said block-strip, a port in the front of the retainer near its base and its valve, a port set oppositely in the back of the retainer near its base and its valve, a bellows secured to the upper side of the rear end of the center board having communication with the interior of the retainer through the port at the rear end thereof, a bellows secured to the under side of the rear end of the center board and the portway forming connection between said bellows and the port in the front end of the retainer, the handle and its L pivoted to a side edge of the center board and the oppositely-extended arms having loose-joint connection with the end of said L, a side brace and the straps having loose-joint connection with the opposite ends of said arms and rigid connection with the ends of said brace, the curved metal straps forming connection between the upper rear corners of the retainer and the side edges of the center board, the corresponding openings therein and the handhold and its rod adapted to adjustment in said holes, substantially as described.

2. In a dust-applicator the combination with a center board and an upper and under bellows attached thereto, and the handle and connecting mechanism adapted to expand one bellows and simultaneously contract the other, of a dust-retainer on the forward end of the center board provided with an inlet for receiving and an outlet for expelling the dust, a port and valve at the rear end thereof in proximity to the base having connection with the upper bellows, a port and valve at the front end thereof also in proximity to its base, a downwardly and rearwardly extended portway forming connection beneath the retainer between said port and the under bellows, and a shield rigidly set within the retainer over each valve and back of its spring-arm, substantially as described.

3. In a dust-applicator the combination with the center board, a bellows attached on the top thereof and a bellows attached on the under side thereof, of a handle and an L thereon having pivotal connection at the L angle with an edge of the center board, the oppositely-extended arms having loose-joint connection with the end of the L, the strap across the top of the upper bellows and the strap beneath the bottom of the under bellows, each having loose connection with their respective arms, and the brace at the side of the bellows opposite said arms having rigid connection with the straps to secure opposite simultaneous expansion and contraction of the bellows as the handle is vibrated, substantially as shown and described.

4. The combination in a dust-applicator with the center board, the upper and under bellows and the retainer, of a port in the front end of the retainer near the bottom, the portway backward through the base of the retainer to a connection with the under bellows, a valve within the retainer, a spring-arm to hold said valve in position and close said port, and a shield set against the end of the retainer and above the valve to prevent the dust falling back of the valve into the port, substantially as described.

5. In a dust-applicator in combination with a center board provided with a lateral extension at the back end, concave at its rear edge, a dust-retainer at the front end of said board provided with inlet, outlet and valves, and the necessary manipulating mechanism, of a bellows attached centrally on said center board its base being on a horizontal with the base of the retainer and its front end connected with the back of the retainer its top spaced from said board, a bellows attached to the under side of said board its front end, projected, beneath the retainer and its base board spaced below said center board, and the guards extended longitudinally around each bellows to prevent the leather protruding when filled with air, substantially as described and shown.

6. In a dust-applicator the combination of a center board and a dust-retainer at one end thereof, a bellows on top and beneath said board each of greater width at its rear end than at its front and having valve connection, respectively, with the rear and front ends of said retainer close to the center board, the separable sectional tube for applying the dust, the holders provided for said tube-sections and the means for operating the bellows, substantially as described and shown.

In testimony whereof I affix my signature in presence of two witnesses.

TILMAN H. HUNT.

Witnesses:
M. O. HUNT,
M. E. HAGEDORN.